Dec. 29, 1970  J. HRDINA  3,551,110
APPARATUS FOR MANOSTATING EVALUATION DEVICES
Filed April 12, 1966  2 Sheets-Sheet 1

INVENTOR.
JIRI HRDINA
BY
Attorney

Dec. 29, 1970  J. HRDINA  3,551,110
APPARATUS FOR MANOSTATING EVALUATION DEVICES
Filed April 12, 1966  2 Sheets-Sheet 2

INVENTOR.
JIRI HRDINA
BY
Attorney

United States Patent Office 3,551,110
Patented Dec. 29, 1970

3,551,110
APPARATUS FOR MANOSTATING
EVALUATION DEVICES
Jiří Hrdina, Prague, Czechoslovakia, assignor to Ceskoslovenska akademie ved, Prague, Czechoslovakia, a corporation of Czechoslovakia
Filed Apr. 12, 1966, Ser. No. 542,164
Claims priority, application Czechoslovakia, Apr. 13, 1965,
2,424/65
Int. Cl. G01f *15/02;* G01n *31/04*
U.S. Cl. 23—253                          8 Claims

ABSTRACT OF THE DISCLOSURE

An apparatus for maintaining fluidal media at a manostatic or constant pressure in a chemical analyzer device such as a tubular detection device for analyzing amino acids. The apparatus comprises a chamber maintained at constant pressure, which chamber is provided with inlet tubes for admitting the fluidal media and outlet tubes for transferring the constant pressure to the device.

This invention relates to an apparatus for manostating that is for keeping a constant pressure in evaluation devices of analysers operating at conditions requiring a pressure different from that of its surroundings.

In laboratory techniques it is sometimes required to maintain a constant pressure, or a pressure varying in accordance with a certain program, at one or several operating places of chemical installations, for example in reactors. This requirement is rather strict in modern analyzers of mixtures of amino acids or in similar devices where the relevant evaluation device requires the maintenance of a constant or programmed pressure. In modern analysers of amino acids this is mainly required because the stream of an eluate mixed with an evaluation regent passes through a relatively long reaction capillary at increased temperatures. In order to reduce depreciation of the separation achieved for example by a preceding chromatographic separation of the mixture into individual components, it is necessary to employ a tubing as short as possible with a sufficiently small cross section, to achieve the required reaction time.

A very effective means which may reduce the otherwise inevitable depreciation during the passage through such a reaction capillary can be provided by employing so called bubble pistons. Another very effective factor is increasing the reaction temperature above the usual value which permits a shortening of the reaction time. However, an increase in the reaction temperature above 100° C. which is the usual value in standard types of analysers, requires an increase of pressure in the reaction space to safely prevent boiling of the reaction liquid and a release of unwanted bubbles of spontaneously released gases dissolved in the reaction mixtures. Finally, the method using bubble pistons requires a high standard of manostating particularly in order to keep the increase of the bubbles due to an increased temperature very accurately at a certain value.

Another step which can substantially reduce an otherwise inevitable depreciation of the division achieved by chromatography is the method of emptying a measuring cell, for example by drawing away, immediately after accomplished measurement of the extinction, the contents by means of a pump. But this quick removal should leave the pressure in the whole reactor substantially unaffected. Manostating should therefore secure a uniform or programmed pressure in the complete hydraulic circuit connected with the reactor and with the evaluation device in such a manner that, for example, even quick introduction of bubbles or quick exhaustion should not greatly affect the maintenance of the programmed pressure. In the latter case it is possible to employ any type of gas for maintaining the pressure in the measuring cell which is being emptied, or the pressure in the evaluation device. A suitable gas for this purpose is for example air, since the only function of this gas is to maintain the pressure. However, when bubbles are forced into the stream of an eluate of amino acids which may be mixed with the evaluation reagent, the employed gas must be an inert one, perfectly freed of air and particularly of admixtures of ammonia. The dosing device which secures introduction of bubbles of a separating gas into the stream of an eluate functions in a substantially simplified manner and is free from the effects of additional pressure which may be of a varying nature in front of the dosing device if the dosing device is supplied at its inlet with a gas, the pressure of which equals accurately enough the pressure maintained for example in the measuring cell which is being emptied, or in the outlet from a standard flow-photometer.

Hitherto employed devices for securing overpressure in a reaction capillary do only create an overpressure by means of hydrostatic pressure. The evaluating eluate is led to an overflow which lies approximately 1 to 1.5 m. above the reactor. By this method only an overpressure of the order of 0.1 kp./cm.$^2$ can be achieved. This little increase of pressures is employed just to reduce to a certain degree the inclination towards spontaneous release of gas bubbles in the reactor, but not to allow a higher reaction temperature to be used.

Existing manostatic devices employed in various technical branches cannot be used for the above stated purpose because they are not sufficiently accurate therefor, and they provide manostating only for a single medium.

In existing types of analysers of amino acids only little attention, to my knowledge at all, has been paid to the problem of maintaining, with regard to the ambient atmospheric pressure, reliably and with sufficient accuracy an increased pressure in a reaction space of a prescribed constant or programmed value, particularly if it is required to manostat several different media, such as required for example in evaluation devices of some modern analysers of mixtures of amino acids and similar materials. In analysers of amino acids which are required to work with an increased efficiency it is necessary to maintain an increased constant pressure in the reaction space which in some types of equipment may be only filled with a reaction liquid, and in other types with alternating sections of a liquid and of another medium, particularly of a gas, not mixing with the first liquid medium. Moreover, in the case of an effective evaluation device it is advantageous to empty the content of the measuring cell after each measuring cycle. In addition to the mentioned method where all the liquid content together with a part of the gaseous content of the measuring cell is drawn away by means of a special pump, there may also occur cases where the evaluated eluate which may contain gas bubbles collects in a holding space wherefrom it is led away either permanently or intermittently beyond the manostated space.

In accordance with this invention manostating of a space for one or several media is accomplished by a manostat device which either admits into the manostated space one of the media, or discharges from the manostated space one or several media, the manostating device interrupting the stream of the media upon an impulse of an indicating device responding to an excess above a tolerated limit of the required manostatic or constant pressure. Various media in the finely manostated space may be separated from each other by resilient walls. In a first stage, the gas pressure from the pressure source is reduced to a pressure slightly higher than the required pressure, and in the following stage said gas is led over an air brake and a valve into a finely manostated chamber containing one or several media or phases. The gas pressure from the pressure source can be first reduced in an intermediate space provided with a safety valve to a pressure slightly higher than the required pressure, and from this intermediate space the gas can be led into the finely manostated chamber. The valve for fine manostating may open or close the passage of the media in accordance with an impulse issued by a sensing element responding to pressure in the manostated chamber.

The apparatus for carrying out the method in accordance with the invention is provided with a device for fine manostating arranged between a first chamber in which there is maintained a roughly manostated pressure, and a second chamber for the finely manostated pressure, the latter chamber being connected with a pressure sensing element which in the case of an inadmissible pressure drop or pressure increase in this chamber transmits an impulse which puts into action the device for fine manostating. But the device for fine manostating may also be placed between the chamber for the fine manostat pressure and the free ambient space, this chamber being connected with a pressure sensing element which, in the case of an inadmissible pressure drop or pressure increase in this chamber transmits an impulse putting into action the device for fine manostating. The sensing element is so adjusted that if there is a larger difference in comparison with the tolerated pressure in the chamber, it puts into action an alarm device, or a device for stopping the function of the entire equipment. The chamber may comprise an elastic partition, the walls of which exert only a negligible pressure upon its internal gas space, this space having a separate outlet from the chamber in addition to the outlet for the gas contained in the chamber. The manostatic space contains conveniently an indication device for indicating the content of the medium in the member having resilient walls. The manostatic space conveniently provided with transparent walls, or with windows of transparent material.

The invention will be best understood from the following specification to be read in conjunction with the accompanying drawings illustrating schematically preferred examples of carrying out the method of the invention.

Figure 1:
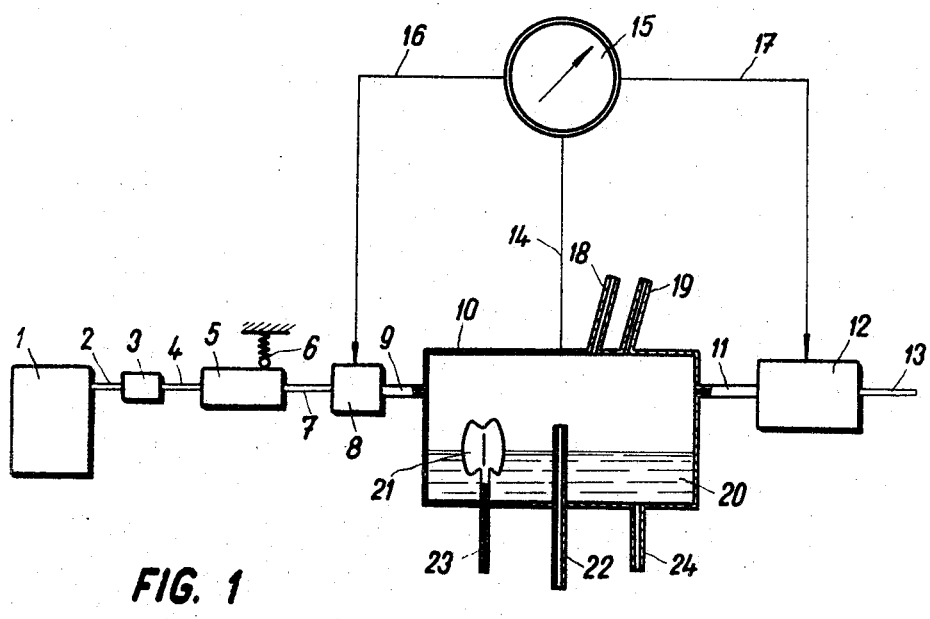
FIG. 1 is an overall outline of one embodiment of the invention.

Referring now more particularly to FIG. 1 the source 1 of the pressure medium is connected by a tube 2 with the device 3 for rough manostating, from where the medium flows through the tube 4 into the chamber 5 provided with a safety valve 6 against an excessive increase of the pressure which might occur if the device 3 for rough manostating lets pressure medium from the space 1 reach the chamber 5 at the full unreduced value. The roughly manostated medium flows from the chamber 5 through the tube 7 over the pressure regulator 8 for fine manostating and through the tube 9, into the chamber 10 in which the pressure is finely stabilized. One or several media contained in the chamber 10 flow therefrom through the tube 11 over the outlet pressure regulator 12 through the tube 13 into the free ambient space, or into a not shown vessel for holding waste. The finely manostated chamber 10 is connected by a tube 14 with the pressure sensing element 15 to measure the pressure therein, and if the tolerance limits for this pressure are exceeded, said sensing element 15 issues an impulse over conduits 16 or 17 into one of the regulators 8 or 12. This impulse may be increased by an inserted not illustrated relay amplifying device.

Into the finely manostated chamber 10 flow through the tubes 18 and 19 either the same or different not mixable media, for example a gas and liquid. The chamber 10 contains then several media, for example three as indicated in FIG. 1, the upper part of the chamber being filled with a gas, the lower part with a liquid 20, and a further gas may be maintained under the same pressure separated from the other media within isolating resilient walls of a rubber container 21. The various above mentioned media can be led from the manostated chamber 10 through separate tubes 22, 23 and 24 into a chemical installation. In up-to-date types of analysers of amino acids these media separated from each other may be for example used in the following manner:

In a photometric cell which is being emptied, the pressure above the level of its content can be maintained by a common gas, for example air, supplied into the chamber 10 by the tube 18 and discharged therefrom through the tube 22. In order to create separating bubble pistons in the reactor, it is necessary to employ an inert gas, for example argon, which can be drawn from the supply in the container 21 through the tube 23. The collected liquid 20 incoming through tube 19 can be discharged from time to time, even with a part of the gas content in the chamber 10 by means of the discharge tube 24.

The device in accordance with FIG. 1 can be modified in various manners, or simplified. For example, in accordance with FIG. 2 the tube 4 which brings the medium into the intermediate chamber 5 may be served by the pump 25 working either permanently, or intermittently, its movement being controlled by a non-illustrated device for rough manostating. This device stops the pump 25 if the pressure in the intermediate chamber 5 has reached a required value.

Figure 3:
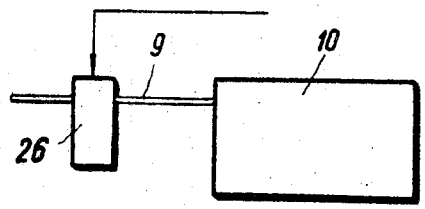

In accordance with FIG. 3 a further simplification can be achieved by manostating the chamber 10 only by regulating the movement of the pump 26 which is either started or stopped or continuously regulated. This can be achieved either by regulating the rotational speed of the pump relative to a constant volume output at one revolution or by the volumetric output of the pump at constant rotational speed. In the case of continuous regulation it is necessary for the regulation signal to have the necessary properties which can be achieved by known methods. For example, the value of the electric voltage or another value controls continually the volume performance of the device which accomplishes a forced entry of the respective medium into the chamber 10.

Figure 2:
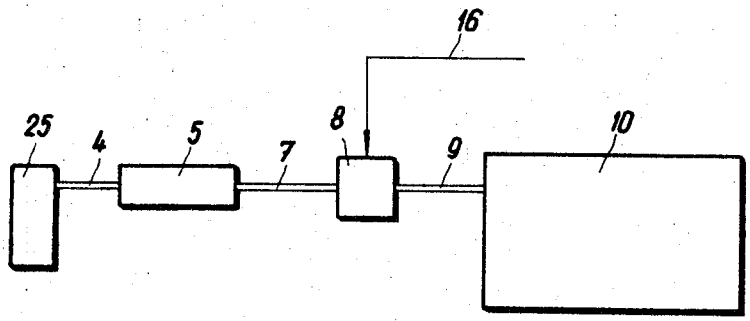
FIGS. 2, 3 and 4 are modifications of parts of the device shown in FIG. 1.

According to FIGS. 2 and 3 it is even possible to eliminate the devices 12 controlling the discharge from the chamber 10. Although this is a simplification, it means a complication in the maintenance of a constant pressure in the chamber 10 in those cases where the pressure in this space is increased independently on forcing the medium into the tube 9. Such cases can for example occur if the temperature increases quickly which produces larger pressure changes due to the temperature increase of the gaseous content of the chamber 10 then can be compensated for the reduction in the supply of the medium through the tube 9, or by its interruption. In the case where there is no off-take through any of the tubes connected with the chamber 10, his change cannot be compensated for at all. Similar conditions apply in the case when a new supply of the medium is let in through the tubes 23 into the container 21 inside the chamber 10 in which fine manostating exists.

Figure 4:
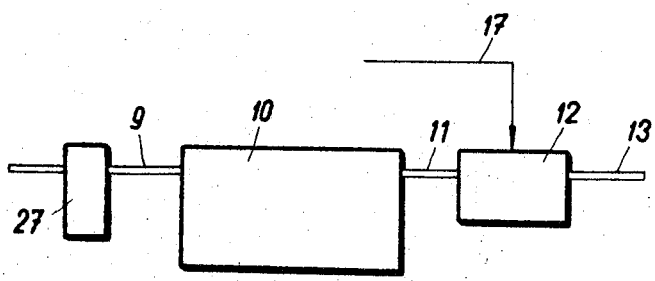

In the latter case it is therefore more advantageous to employ a regulated discharge through the tube 11 from the chamber 10, as illustrated in FIG. 4. This can be accomplished together with the regulation of the inlet through the tube 9. If the discharge through the tube 11 is regulated by means of the device 12, it is even possible to eliminate completely regulation of the supply of the medium through the tube 9 into the chamber 10. The device for securing a permanent supply of the medium through the tube 9 into the chamber 10 can be either an independent pump 27 which need not be regulated, or a non-illustrated pressure bottle provided with a regulating discharge cock or tap. The device regulating the medium flowing away through the tube 11 through the device 12 regulating the discharge corresponds to the device described with reference to FIG. 1.

For some purposes it may be sufficient to maintain constant pressure in the chamber 10 by hydrostatic means even though the pressure may not be entirely constant and may gradually change with time. However, such devices can secure in an extraordinary simple manner a high degree of perfect manostatic function in short time periods. In these cases which can be advantageous mainly with small overpressures lying in the order of 0.1 kp./cm.$^2$, manostating can be achieved in that the liquid volume 20 in the manostated space 10 is hydraulically connected with the liquid in a vessel placed sufficiently high so that the height difference of its level with respect to the level of the liquid 20 in the space 10 is made properly use of. This can be achieved rather easily up to overpressures 0.15 kp./cm.$^2$ if the two vessels are placed in the same apparatus and if for example water is used as the liquid. If mercury is used under otherwise equal conditions, it is possible to reach pressures which are thirteen times higher. But a large content of mercury in the vessels is of substantial disadvantage. If higher pressures are to be achieved using water, a large difference of height must be secured; manostating is achieved in several steps separated from each other with a height difference of approx. 1.5 m. which is a reasonable locational value in the apparatus. One of the vessels is located outside the apparatus, for example at a higher floor of the same building.

Figure 5:
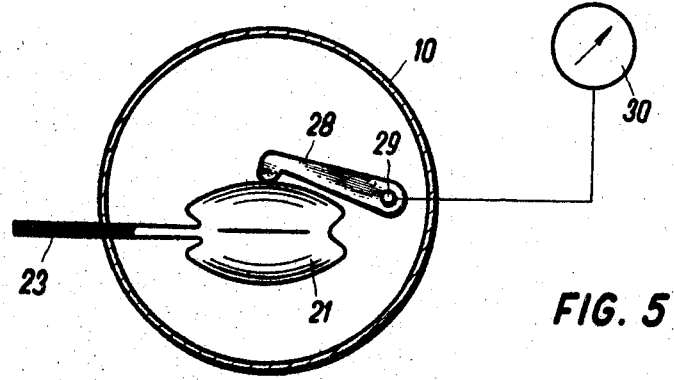
FIG. 5 illustrates schematically a manostatic chamber including a device for indicating the content of the medium in a container having resilient walls.

FIG. 5 illustrates schematically an embodiment of a manostated chamber 10 with a resilient container 21 containing another medium. The volume of this medium in the member 21 is of course limited and must be controlled from time to time and replenished. This may be accomplished by heating the resilient member 21 with the lead-out 23 in a chamber 10 for example of cylindrical shape. An indicator of the content of the member 21 such as the lever 28 rests with its free end against the upper resilient wall of the member 21; this lever 28 which pivots about the pin 29 functions in cooperation with the pressure indicator 30 similar to level gauges in gasoline tanks.

The above described indicator may of course be omitted if the manostatic chamber 10 is a transparent vessel, or it is at least provided with one or several windows allowing to visually control whether the volumetric amount of the volume of the medium in member 21 is yet large enough to be a sufficient operational supply.

I claim:
1. In an apparatus for maintaining a constant pressure above the ambient pressure in a chemical substantially tubular installation carrying a flow of liquid to be analyzed and including a detection device particularly for analyzing amino acids, the improvement comprising in combination a chamber maintained at a constant pressure; means for creating and maintaining said constant pressure, said means comprising:
means for regulating a supply of pressure medium to said chamber, said pressure regulating means communicating with said chamber;
means for sensing the pressure in said chamber, said pressure sensing means communicating with said chamber;
said pressure regulating means communicating with and controlled by said pressure sensing means to maintain said constant pressure in said chamber;
at least two inlet tubes carrying into said chamber one of at least two immiscible fluidal media, one medium assembling at the bottom portion of said chamber and the other thereabove; and at least two outlet tubes connecting said chamber with the said chemical installation to transfer the constant pressure thereinto, the outlet tubes being located in the lower portion of said chamber and at least one of said outlet tubes being of sufficient length to extend upwardly through the lower medium into the upper medium.

2. An apparatus according to claim 1 wherein one of the media is liquid and the other gaseous and wherein said pressure regulating means comprises an inlet pressure regulating means and an outlet pressure regulating means, said inlet and outlet pressure regulating means cooperating with said pressure sensing means to maintain said constant pressure in said chamber.

3. In an apparatus according to claim 1 at least one resilient container in said chamber for separately maintaining another fluidal medium at said chamber pressure and an outlet tube attached thereto leading into the installation to transfer the constant pressure thereto.

4. An apparatus for simultaneously maintaining at least two immiscible fluidal media at constant equal pressure in a chemical analyzer device, which apparatus comprises
a chamber maintained at said constant pressure;
means for maintaining said constant pressure, said means comprising:
means for regulating a supply of pressure medium to said chamber, said pressure regulating means communicating with said chamber;
means for sensing the pressure in said chamber, said pressure sensing means communicating with said chamber;
said pressure regulating means communicating with and controlled by said pressure sensing means to maintain said constant pressure in said chamber;
at least two inlet conduit means connected to said chamber for carrying into said chamber said two media, the more dense medium forming a lower layer and the less dense medium forming an upper layer in said chamber; and at least two outlet conduit means connected to said chamber for carrying out of said chamber said two media at said constant equal pressure, the outlet conduit means being located in the lower portion of said chamber, and at least one of said outlet conduit means being of sufficient length to extend through the lower layer into the upper layer.

5. An apparatus for simultaneously maintaining at least two immiscible fluidal media at constant equal pressure in a chemical analyzer device, which apparatus comprises
a chamber maintained at said constant pressure;
means for creating and maintaining said constant pressure;
at least two inlet conduit means connected to said chamber for carrying into said chamber said two media, one medium assembling at the bottom portion of said chamber and the other medium assembling thereabove;
at least two outlet conduit means connected to said chamber for carrying out of said chamber said two media at said constant equal pressure;
at least one resilient container disposed within said chamber for separately maintaining another fluidal medium at said constant pressure; and
conduit means connected to said container and to said chamber for carrying out of said chamber at said constant pressure said fluidal medium in said container.

6. An apparatus for simultaneously maintaining at least two fluidal media at constant equal pressure in a chemical analyzer device, which apparatus comprises
a chamber maintained at said constant pressure;
means for creating and maintaining said constant pressure;
inlet conduit means connected to said chamber for carrying into said chamber one of said media;
at least one resilient container disposed within said chamber for separately maintaining another of said media at said constant pressure; and outlet conduit means connected to said container and outlet conduit means connected to said chamber for carrying out of said chamber at said constant pressure said fluidal media.

7. The apparatus of claim 6, which apparatus further comprises means for indicating the supply of said fluidal medium in said resilient container.

8. The apparatus of claim 7, which apparatus further comprises a second inlet conduit means connected to said chamber for carrying into said chamber another fluidal medium, said fluidal media external to said resilient container being immiscible, one of said immiscible media assembling at the bottom portion of said chamber and the other of said immiscible media assembling thereabove.

References Cited

UNITED STATES PATENTS

| 2,946,665 | 7/1960 | Skeggs | 23—230Bio |
| 3,116,754 | 1/1964 | Ferrari | 23—253X |
| 3,230,048 | 1/1966 | Skeggs | 23—230X |
| 3,249,403 | 5/1966 | Bochinski et al. | 23—259X |
| 3,285,701 | 11/1966 | Robertson | 23—230X |
| 3,366,149 | 1/1968 | Taft et al. | 23—253X |
| 3,408,166 | 10/1968 | Natelson | 23—254 |

MORRIS O. WOLK, Primary Examiner

R. E. SERWIN, Assistant Examiner

U.S. Cl. X.R.

73—199